United States Patent [19]

Matheny

[11] Patent Number: 4,829,561
[45] Date of Patent: May 9, 1989

[54] APPARATUS FOR OPTICALLY COUPLING A TERMINAL UNIT TO THE PUBLIC TELEPHONE NETWORK THROUGH A PAY TELEPHONE INSTRUMENT AND THE LIKE

[75] Inventor: Mark Matheny, Manchester, Conn.

[73] Assignee: Tek Electronics Manufacturing Corporation, Manchester, Conn.

[21] Appl. No.: 173,666

[22] Filed: Mar. 25, 1988

[51] Int. Cl.⁴ ............................................. H04M 17/02
[52] U.S. Cl. ........................................ 379/144; 379/58
[58] Field of Search ...................... 379/144, 58, 63, 91

[56] References Cited

FOREIGN PATENT DOCUMENTS 2538978 7/1984 France ................................. 379/144

Primary Examiner—Robert Lev
Attorney, Agent, or Firm—McCormick, Paulding & Huber

[57] ABSTRACT

Apparatus including a terminal unit is optically coupled to a station unit associated with a coin operated type pay telephone instrument permitting a user to access and be connected to the public telephone network via the terminal unit wherein electrical supervisory and audio baseband frequency signals are converted to an infrared energy beam for transmission to the station unit. The station unit senses the infrared energy beam and reconverts it to an electrical supervisory and audio baseband frequency signal and in response to the supervisory signal causes the telephone line to be coupled to the station unit. Electrical audio baseband frequency signals are converted to an infrared energy beam for transmission to the terminal unit where it is sensed and reconverted to an electrical audio baseband frequency signal which in turn is used to excite a transducer to produce an audible signal corresponding to the audio signal on the telephone line.

15 Claims, 8 Drawing Sheets

APPARATUS FOR OPTICALLY COUPLING A TERMINAL UNIT TO THE PUBLIC TELEPHONE NETWORK THROUGH A PAY TELEPHONE INSTRUMENT AND THE LIKE

BACKGROUND OF THE INVENTION

The present invention relates generally to telephonic communications and deals more specifically with communication on the public telephone network wherein a user via a remote, portable, wireless terminal unit establishes a two-way optical communication path with a coin operated telephone instrument and the like equipped with the station unit of the invention.

Telephonic communication via the public telephone network has grown substantially over the past few years as the numbers of the traveling public become larger and as more and more people become reliant on the ability to communicate with others to gain their livelihood, such as, for example, salesmen and the like. Such communication is generally accomplished utilizing the so-called pay or coin operated telephone instrument and includes credit card and the like type operated telephone instruments. In order to meet the increased demand for access to the public telephone network, the so-called cellular type telephone service was introduced wherein a user is assigned a dedicated telephone number and may originate and receive telephone calls by means of a cellular type telephone instrument cooperating with a mobile radio receiver. Although cellular type telephone service permits a user to place and receive a call from any location within a cellular area from his own cellular telephone, cellular telephone instruments and cellular telephone service are relatively expensive and in some instances not available in all geographic locations. Accordingly, the majority of telephone callers still access the public telephone network via conventional coin-operated, credit card and the like type telephone instruments.

There are a number of disadvantages associated with the so-called "public pay phone" among which disadvantages are concerns about the spread of viral infectious diseases, bacteria and other contaminates that may be present on the public pay telephone handset/receiver.

Another disadvantage associated with public pay telephones, particularly those located in an outdoor or unprotected environment, is a user must necessarily be exposed to the effects of inclement weather, lack of privacy, etc., when placing a call from such a located pay telephone.

Yet a further disadvantage associated with pubic pay telephones, especially in areas of high usage such as airport, bus and train terminals, is the valuable wall and floor space that is occupied by the large number of public pay telephones that are generally present to accommodate the traveling public.

It is desirable therefore, to provide a telephonic device that is portable and personal to a user and which permits access to the pubic telephone network while overcoming the above disadvantages and accordingly, it is the general object of the present invention to provide such a device.

SUMMARY OF THE INVENTION

In accordance with the present invention, apparatus for accessing and connecting a user to the public telephone network includes a station unit associated with a coin operated, credit card and the like pay telephone and a wireless, remote, portable terminal unit. The station unit has two operative states which permits the pay telephone to operate in a conventional, normal manner when in one state. The station unit is coupled optically to the wireless, remote terminal unit when in the second state to complete a transmission path between the handset of the terminal unit through the pay telephone to the public telephone network. The handset of the terminal unit includes a microphone, earpiece receiver and keypad for dialing telephone numbers.

Supervisory and audio baseband frequency signals are transmitted between the terminal unit and the station unit via an energy beam, such as for example, a beam of light in the infrared frequency spectrum. In one aspect of the invention, a receiver/transmitter of the terminal unit is aimed so to speak in the direction of the station unit located at the pay telephone instrument. A telephone call is originated from a terminal unit by operating a switch which causes circuitry within the handset of the terminal unit to produce an "off-hook" baseband frequency supervisory signal which supervisory signal is converted to an infrared signal and is transmitted to the station unit. A photodiode or other optical receiving device at the station unit senses and detects the infrared optical signals and is coupled to supervisory circuitry within the station unit. The supervisory circuitry generates the proper "off-hook" signal to cause the station unit to operate to its second state wherein the telephone line is now coupled to the telephone instrument through the station unit. A dial tone signal is returned from the public telephone network to the station unit which converts the dial tone signal to an infrared optical signal for transmission to the terminal unit. A photodiode or other optical receiving device at the terminal unit senses and detects the infrared optical signal transmitted from the station unit and which sensed signal is coupled to circuitry within the terminal unit. The infrared optical signal is converted into an electrical signal which is representative of the dial tone signal and which electrical signal is transformed by the earpiece receiver into an audible signal as the familiar audible dial tone indicating that a connection is established between the pay telephone instrument and the central office equipment of the public telephone network.

A telephone number is dialed on the keypad of the handset and is transmitted via the infrared optical beam to the station unit. The digits of the telephone number are standard dual tone multi-frequency (DTMF) touch-tone signals. As is the case of the "off hook" baseband frequency signal the optically transmitted touch-tone signals are converted to an electric signal having the corresponding touch-tone frequencies for transmission onto the public telephone network and reception ultimately by the central office equipment. In the above arrangement, the user may tap in the desired telephone number and a telephone credit card number in the normal manner on the keypad to cause the central office telephone equipment to validate and make the desired call connection in the same way that a telephone number and credit card number entered from a keypad directly on the pay telephone.

Since the pay telephone instrument need not be accessible by a user, it may be mounted above the normal floor space occupied by a conventional pay telephone thus alleviating floor space problems in congested areas.

In one embodiment of the invention, the receiver/transmitter of the terminal unit is arranged as a separate unit for attachment to the visor of an automobile which permits the receiver/transmitter to be aimed at the station unit located in the vicinity of a pay telephone instrument. In this arrangement, power is supplied to the handset and receiver/transmitter from the vehicle's power system.

In another aspect of the invention, the handset and transmitter are arranged to be accommodated for example, in a briefcase and is equipped with a battery for portability. This embodiment is primarily intended to be used in indoor areas such as airports, train and bus terminals wherein the pay telephone instrument equipped with a station unit is not directly accessible by a user. However, it will be understood that this embodiment may be used equally as well in an outdoor environment.

BRIEF DESCRIPTION OF THE DRAWINGS

Additional objects, features and advantages of the present invention will become readily apparent from the following written description and claims taken in conjunction with the drawings wherein:

DETAILED DESCRIPTION OF THE PREFERRED EMBODIMENTS

Figure 1:
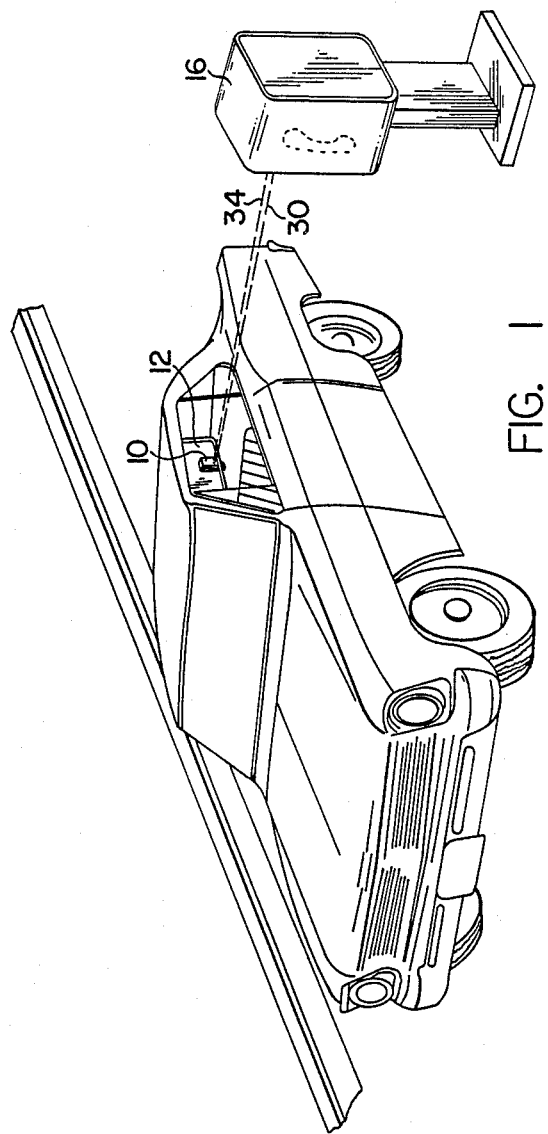
FIG. 1 is a perspective, somewhat conceptual illustration showing the transmitter portion of the terminal unit of the invention attached to an automobile visor and aimed in the vicinity of the station unit of the invention arranged to cooperate with a pay telephone.
Figure 2:
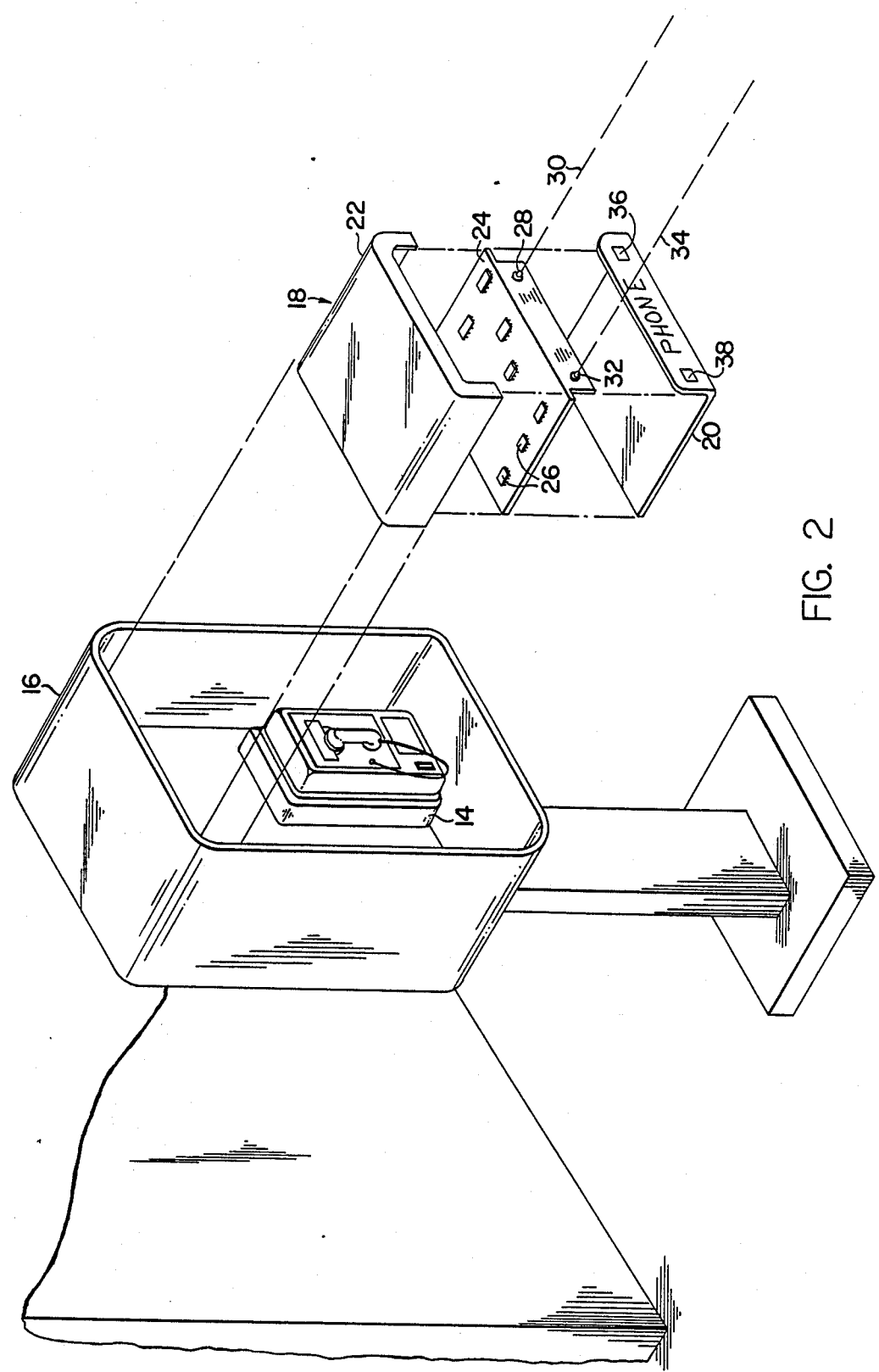
FIG. 2 is a somewhat perspective, exploded view of the station unit embodying the present invention showing one possible mounting arrangement with the pay telephone.

Turning now to the drawings and considering FIGS. 1 and 2, FIG. 1 illustrates the receiver/transmitter unit 10 of a terminal unit 11 embodying the present invention mounted on a visor 12 of an automobile and oriented such that the receiver/transmitter unit 10 is aimed generally in the direction of a station unit associated with a coin operated pay-type telephone instrument which can best be seen in FIG. 2. In FIG. 2, the coin telephone instrument is designated 14 and is mounted in a standard enclosure unit 16. The station unit embodying the present invention is designated 18 and is shown in a slightly exploded view. The station unit 18 includes a base 20 and cover 22 which enclose an electronic circuit board 24 upon which are mounted electronic components 26,26 comprising the circuitry of the station unit. The circuit board 24 also includes a device such as, one or more light emitting diodes (LEDs) 28, 28 for generating an energy beam for example, an optical beam 30. The station unit 18 also includes an optical sensing and detecting device such as a photodiode 32 for receiving an energy beam, for example, an optical beam 34 originated at the receiver/transmitter unit 10. The station unit 18 also includes optical filters 36 and 38 through which the optical beams 30 and 34, respectively pass. The optical filters 36 and 38 limit the energy sensed by the photodiodes and which energy is in the form of visible or ambient light.

Figure 3:
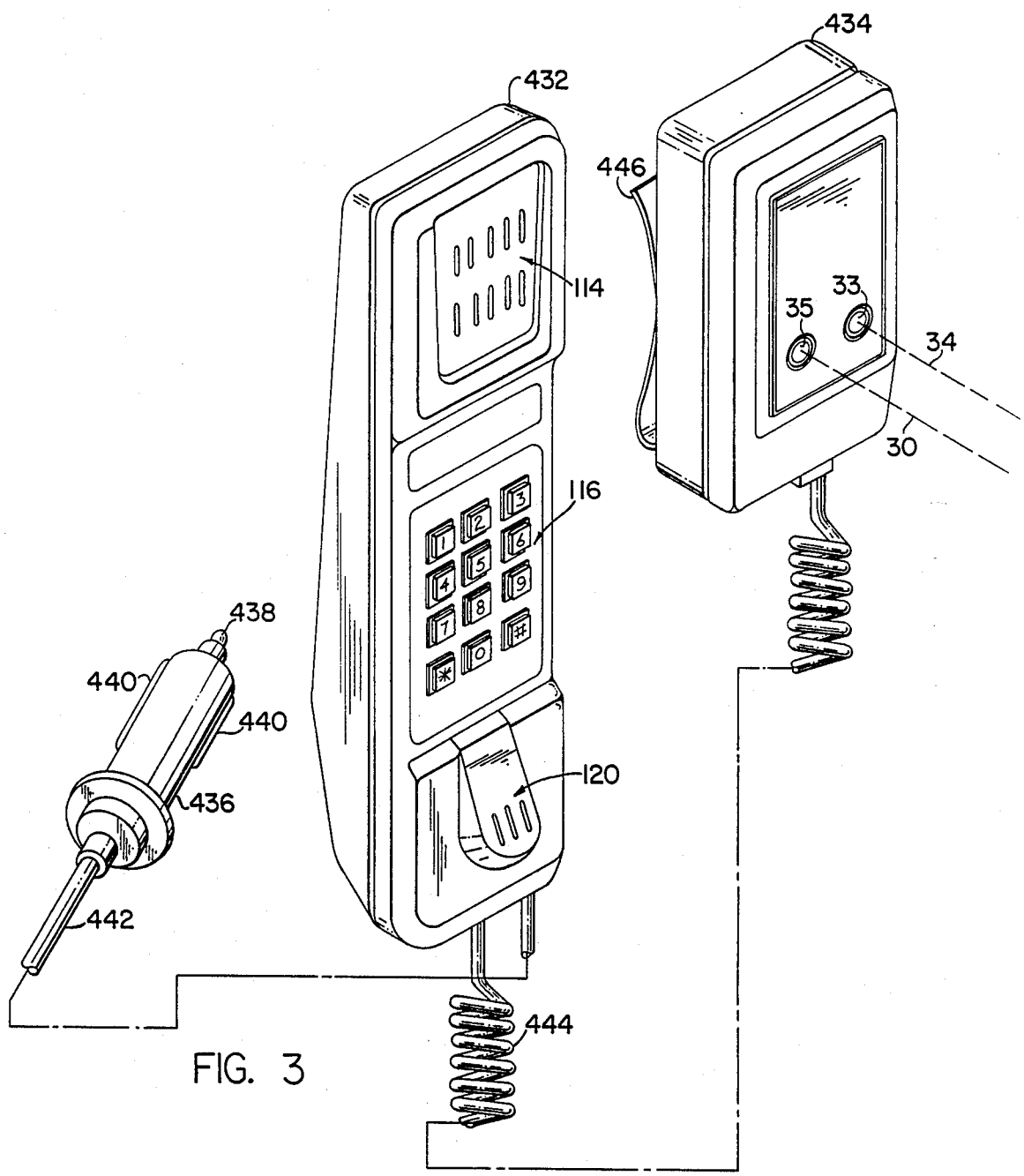
FIG. 3 is a somewhat perspective view of the terminal unit embodying the present invention wherein the energy beam receiver/transmitter unit is separate from the handset containing the earpiece, microphone and keypad.

Turning now to FIG. 3, one embodiment of the terminal unit 11 is shown wherein the terminal unit 11 includes a handset 432, a receiver/transmitter unit 434 and a power plug 436. The handset 432 comprises a keypad generally designated 116, a microphone built into the handset and generally designated 120 and an earphone generally designated 114 also built into the handset. The power required for the circuitry within the handset 432 and the receiver/transmitter unit 434 is provided, in the case of a terminal unit designed for use with a vehicle, from a power plug 436 adapted to be inserted into the cigarette lighter receptacle of the vehicle. Typically, a battery voltage potential from the vehicle is applied at the tip 438 and ground reference potential is applied to the side terminals 440,440. Both the battery voltage potential and the ground reference potential are connected to an electrical conduit 442 which carries the voltage and ground reference potentials from the power plug 436 to the handset 432. The handset 432 is in turn connected via a conductor 444 to the receiver/transmitter 434.

The receiver/transmitter 434 includes in the illustrated embodiment, a visor clip 446 for attaching the receiver/transmitter 434 to the visor of the vehicle. The receiver/transmitter 434 also generates, as illustrated schematically in FIGS. 1 and 4, an optical beam 34 produced by light emitting diodes (LEDs) located behind an optical filter 33. The receiver/transmitter unit 434 also includes optical detectors located behind an optical filter 35 for sensing and detecting an optical beam 30 produced by the station unit (not illustrated in FIG. 3). It will be understood that the handset and receiver/transmitter unit 434 may be packaged as a single integral unit and may also include an internally housed battery. For example, the terminal unit may be packaged to fit into a user's briefcase and to operate with a station unit at a pay telephone instrument located in an airport, railroad station, or other such area where pay telephone instruments are generally located.

Figure 4:
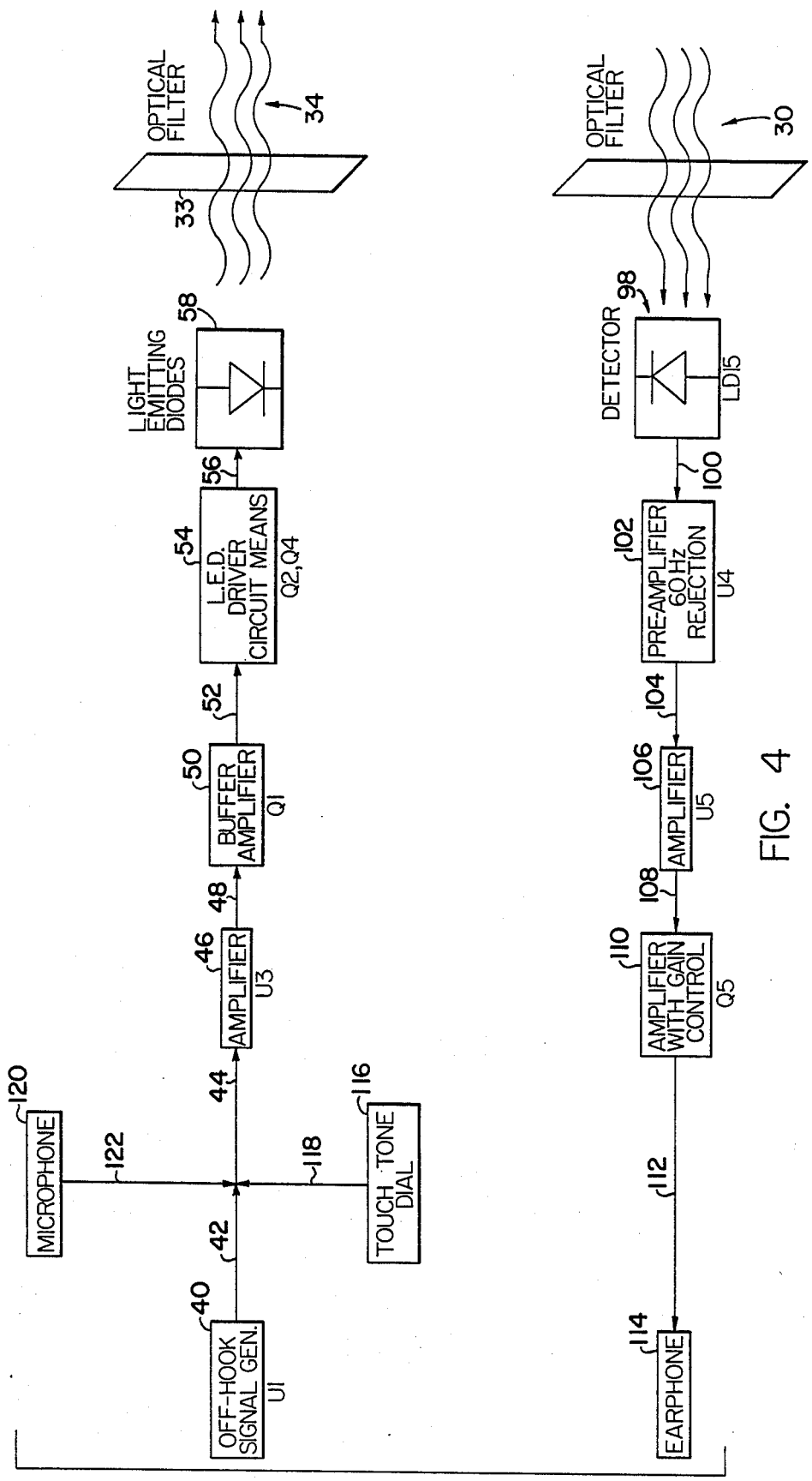
FIG. 4 is a schematic block diagram showing the major functional components of the terminal unit of the present invention.
Figure 5:
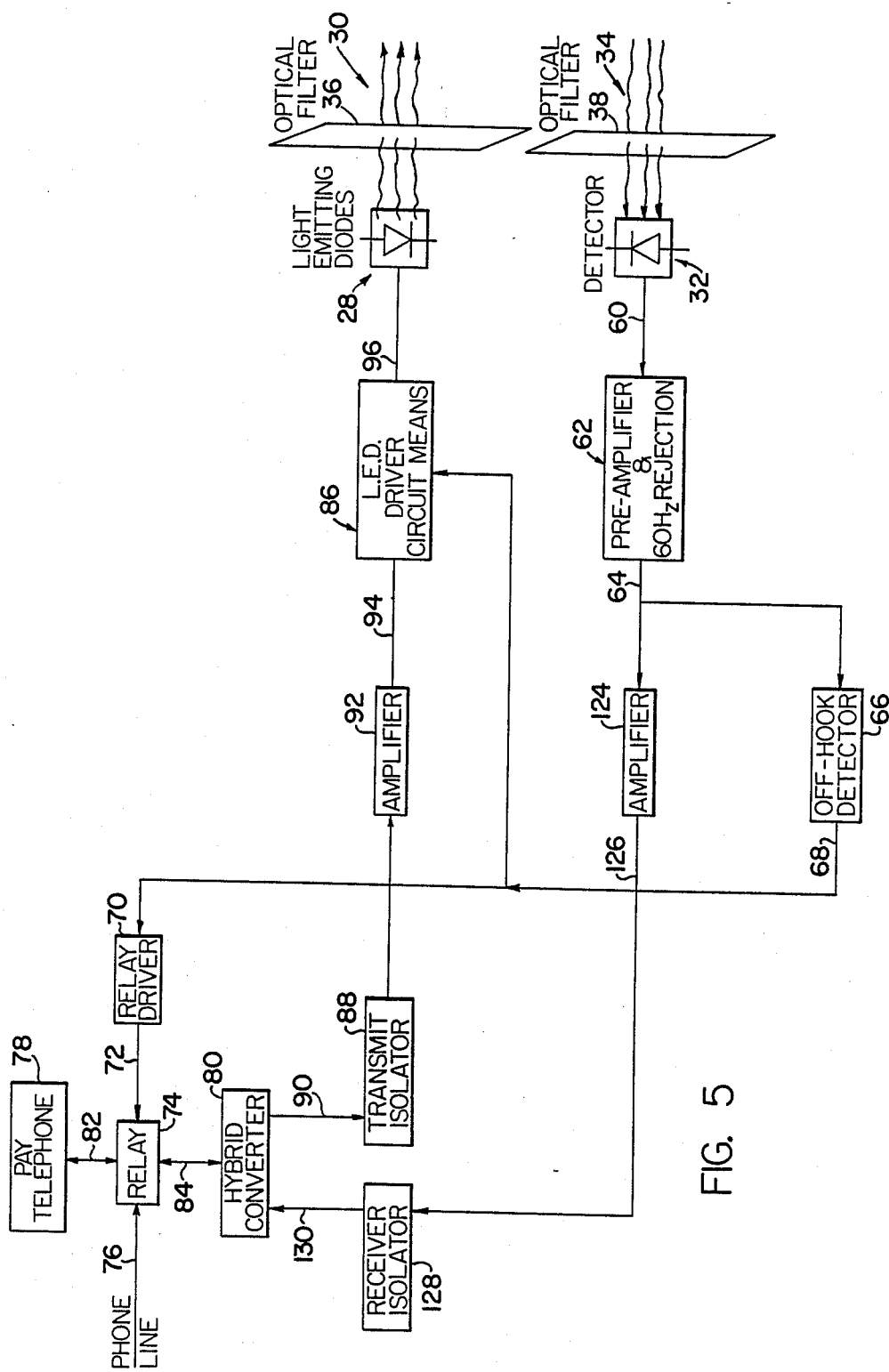
FIG. 5 is a schematic block diagram showing the major functional components of the station unit embodying the present invention.

Turning to FIGS. 4 and 5, FIG. 4 illustrates in block diagram form the major functional component blocks of the terminal unit and FIG. 5 illustrates in block diagram form the major functional component blocks of the station unit embodying the present invention. Still referring to FIGS. 4 and 5, communication between the terminal unit and the station unit occurs as follows. user generates a request for service via an "off-hook" signal which is produced by an "off-hook" signal generator represented by the function block 40 which generator produces a baseband frequency signal at its output 42 which in turn is fed to the summing input 44 of an amplifier represented by the function block 46. The amplified "off-hook" signal is fed from the output 48 of the amplifier 46 to the input of a buffer amplifier indicated by the function block 50. The buffer amplifier 50 produces a signal at its output 52 which is coupled to the input of one or more light emitting diode (LED) driver circuit means represented by the function block 54. The LED driver circuit means 54 produces a signal at its output 56 which excites light emitting diodes (LEDs) represented by the function block 58. The LEDs produce an infrared beam 34 which is representative of and carries the baseband frequency information of the off-hook signal.

The infrared beam 34 is directed toward the station unit, shown in FIG. 5 and passes through an optical filter 38 which removes any unwanted portions of the frequency spectrum associated with the surrounding ambient light. The infrared beam 34 is sensed and detected by a photodiode represented by the function block 32 and which photodiode produces an output voltage signal on lead 60 which is proportional to and representative of the "off-hook" signal. The output signal on lead 60 is amplified and filtered by circuitry contained within the function block 62. The filtered output voltage signal on lead 64 is sensed and detected by an "off-hook" detector circuit means contained within function block 66 and generates an "off-hook" voltage signal at its output 68.

The detected "off-hook" voltage signal is used to activate a relay driver circuit 70 whose output 72 operates a relay 74 which has a number of transfer contacts to transfer the tip and ring of the telephone line 76 to connect the telephone instrument 78 to a two-wire to four-wire hybrid converter circuit means 80. Leads 82, 82 are connected between the relay 74 and the telephone instrument and leads 84, 84 are connected between the relay and the hybrid circuit 80. In addition, the detected "off-hook" signal is transmitted to an LED driver circuit means represented by the function block 86 and which "off-hook" signal enables the LED driver circuit means. Dial tone is produced by the telephone central office equipment and is present across the tip and ring of the telephone line 76. The dial tone voltage signal is supplied to the hybrid converter circuit means 80 through the relay 74 and leads 84, 84. The hybrid converter 80 is connected to a transmit isolator circuit means 88 by lead 90 and which isolator circuit means couples the dial tone voltage signal to an amplifier 92. The output 94 of the amplifier 92 is fed to the LED driver circuit means 86 which in turn produces a signal at its output 96 to excite the LEDs 28, 28. The LEDs 28, 28 produce an infrared beam 30 which carries the baseband frequency dial tone signal.

As illustrated in FIG. 4, the infrared beam 30 is sensed at the terminal unit by a detector 98. The signal at the output 100 of the detector 98 is amplified and filtered by circuitry within the function block 102 to remove 60 hertz interference and which filtered signal is outputted on lead 104 which lead 104 is coupled to an amplifier 106. The output 108 of the amplifier 106 is inputted into an amplifier and gain control circuit means contained within the function block 110 and which has an output 112 coupled to a receiver or earphone 114. The earphone 114 converts the electrical signals on lead 112 to an audio signal, in this case, a dial tone signal alerting a user that a telephone number may now be dialed and that a connection has been completed between the station and terminal units.

A telephone number is dialed using dual tone multifrequency (DTMF) signals corresponding to standard touch-tone frequency signals via a keypad and touch-tone generator contained within the function block 116. The touch-tone baseband frequency signals are outputted on lead 118 which is coupled to the sensing input 44 of the amplifier 46 and are processed for transmission to the station unit in the same manner as the "off-hook" signal as explained above. Likewise, acoustic energy, such as speech and the like, is sensed by a microphone 120 and converted to electrical signals which appear at its output 122. The microphone output 122 is coupled to the summing input 44 of the amplifier 46 and signals representative of speech are processed and transmitted to the station unit as explained above in conjunction with the sending of the "off-hook" signal. The infrared beam 34 carrying voice or touch-tone signals is sensed and detected at the station unit in the same manner as the "off-hook" signal is detected as explained above.

The signals representative of speech and touch-tone are also conditioned by the preamplifier and 60 hertz rejection circuitry contained in function block 62 and which conditioned signals are outputted on lead 64 which is connected to an amplifier 124. The output of amplifier 124 is coupled via lead 126 to a receiver isolator circuit means contained within function block 128. The receiver isolator circuit means 128 has an output 130 coupled to the hybrid converter circuit means 80 which hybrid converter receives the baseband frequency signals representative of speech and touch-tone. The hybrid converter 80 couples the signals to the tip and ring of the telephone line 76 via leads 84, 84 connected through the transfer contacts of the relay 74.

Speech or other signals within the voice frequency spectrum are coupled from the telephone line 76 through the transfer contacts of the relay 74 into the hybrid converter circuit means 80. The signals are coupled to the transmitter isolator circuit means 88 via the output lead 90 of the converter and are inputted to the amplifier 92 for amplification. The output 94 of the amplifier 92 activates the LED driver circuit means 86 which in turn excites the light emitting diodes 28 to produce an infrared energy beam 30 for transmission to the terminal unit. As in the case of receiving a dial tone signal as described above, the speech and other signals carried by the infrared beam 30 are sensed and detected by the detector 98 and ultimately presented to the earphone 114 for conversion into an acoustic signal.

Figure 6:
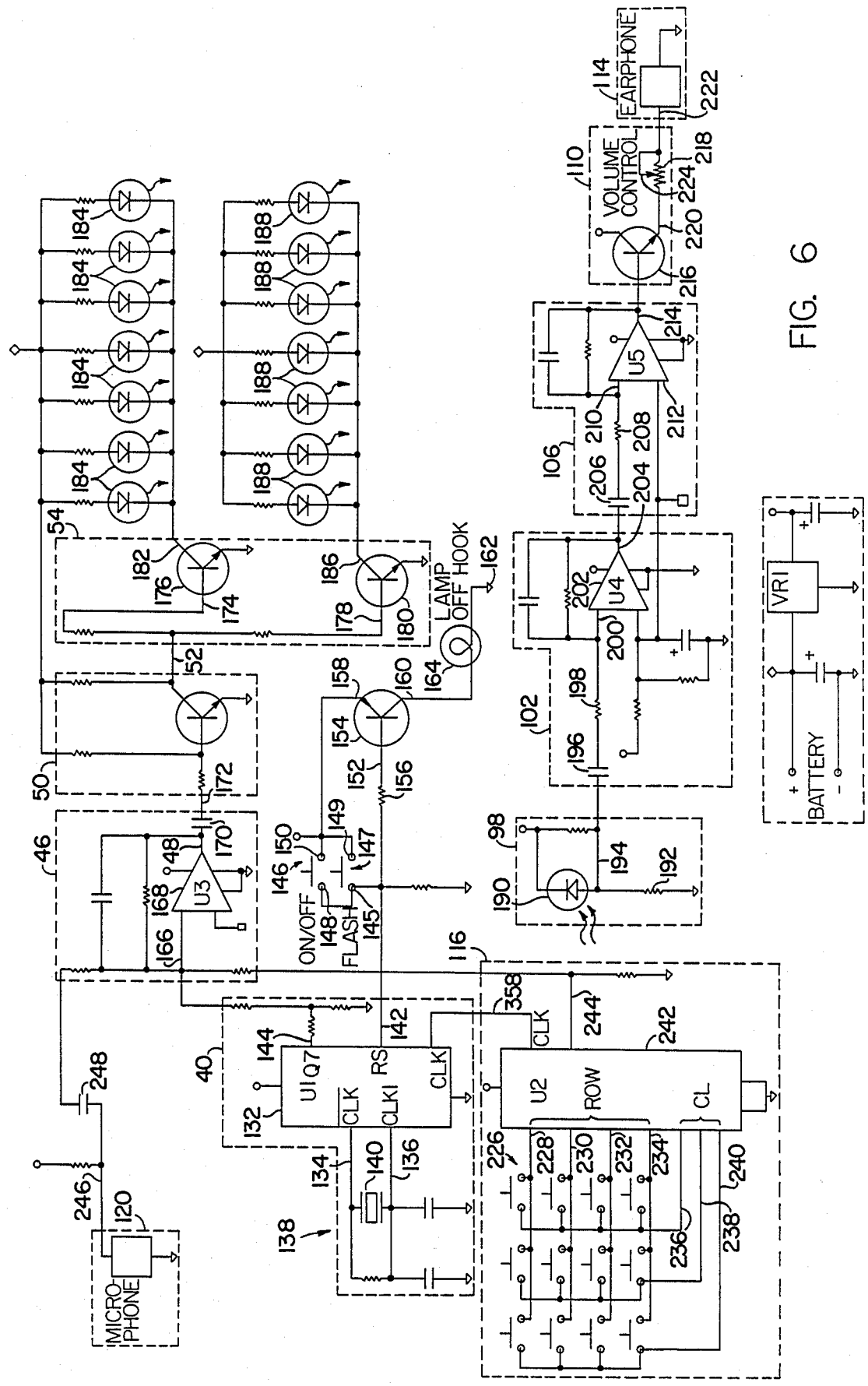
FIG. 6 is an electrical schematic circuit diagram showing one possible implementation of the terminal unit of the present invention.
Figure 7A:
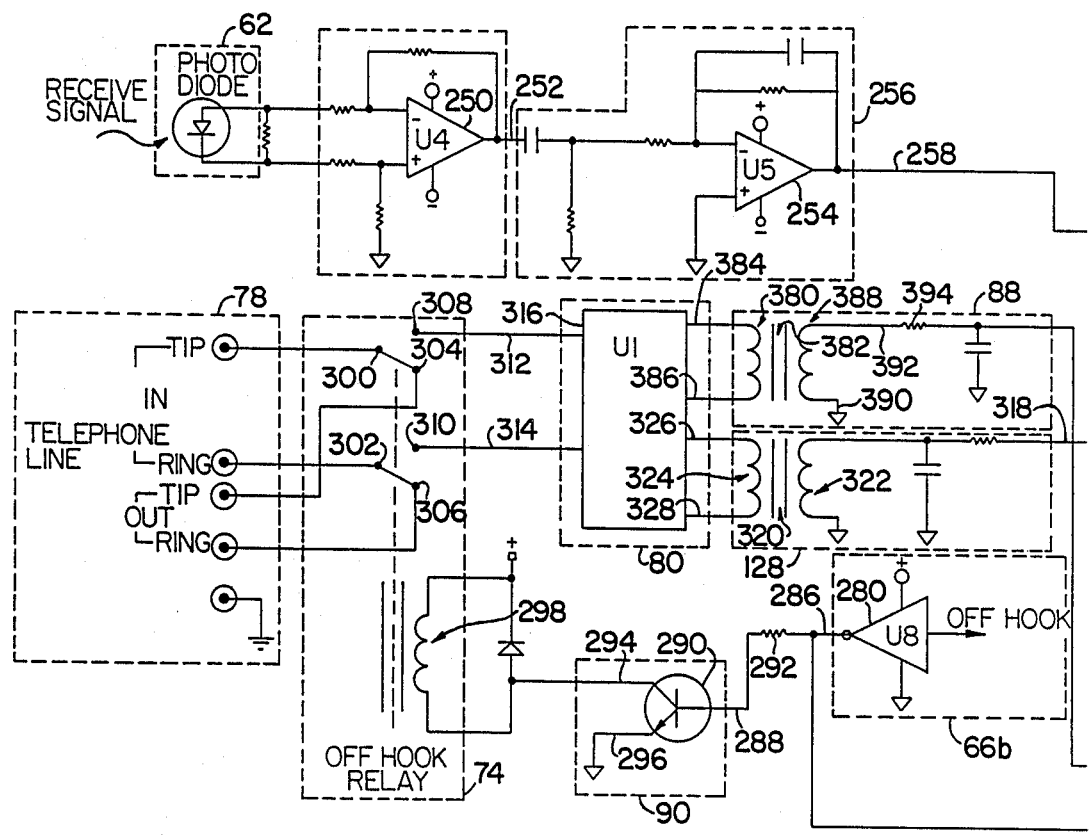
FIGS. 7a & 7b are electrical schematic diagrams showing one possible implementation the station unit of the present invention.
Figure 7A:
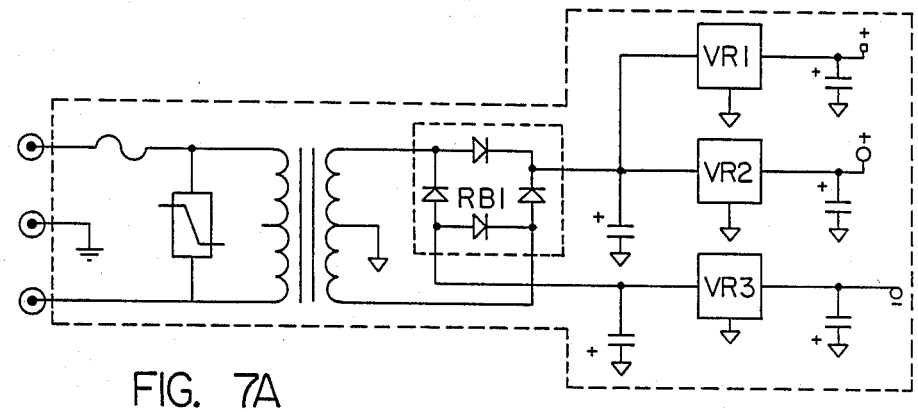
Figure 7B:
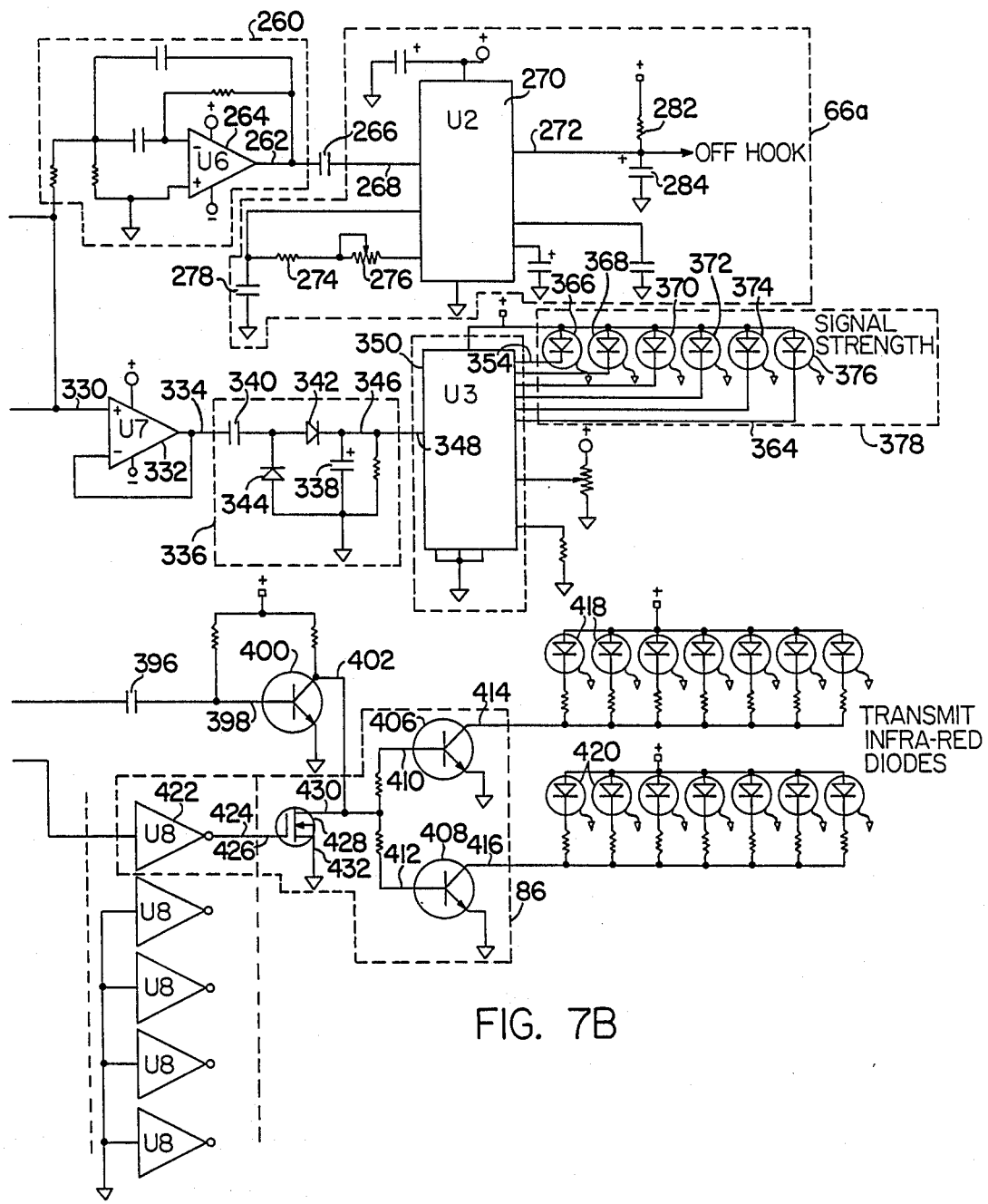

Turning now to FIGS. 6 and 7, an exemplary electrical circuit implementation is illustrated for the station and terminal units embodying the present invention. Considering first the initiation of a telephone call by a user from a terminal unit, the "off-hook" signal generator 40 illustrated in FIG. 4 is shown within the dotted line box 40 in FIG. 6. The circuitry comprising the generator 40 includes a high speed binary ripple carry counter 132 having clock inputs 134 and 136 coupled to a crystal oscillator generally designated 138 and having a crystal 140 whose oscillation frequency is 3.58 megahertz. The counter 132 is reset with a logical high voltage signal applied to the reset lead 142 which prevents the counter from producing an output pulse at its output lead 144 and which condition corresponds to the terminal unit being in an "on-hook" or idle condition. The logical high reset voltage signal is supplied through operation of an ON/OFF switch 146 to its ON position which switch has one terminal 148 connected to the reset lead 142 and a second terminal 150 connected to a voltage potential designated VCC thereby inhibiting the counter 132. The contact 148 of the switch 146 is also connected to the base 152 of a transistor lamp driver 154 through a resistor 156 to cause the transistor 154 to be non-conductive. Upon operation of the switch 146 to its OFF position, the voltage VCC is disconnected from the terminal 148 causing the transistor 154 to become conductive. The transistor has its emitter 158 connected to the voltage source VCC and its collector 160 connected to a ground reference potential 162 through an indicator lamp 164 to light the lamp to indicate that the terminal is in an "off-hook" condition. In the "off-hook" condition, the logical high reset voltage signal is removed from the reset terminal 142 which now enables the counter 132. The counter 132 produces an output pulse at a frequency of 27.968 kiloherz (28 KHz) at its output lead 144. It will be recognized that the 28 KHz "off-hook" signal is generated continuously when the terminal unit is in the "off-hook" condition.

The 28 KHz output signal on lead 144 is connected to the summing input 166 of an operational amplifier 168, the operation of which amplifier is well understood by those skilled in the art. The output 48 of the amplifier 168 is coupled through a series capacitor 170 to the input 172 of a transistor buffer amplifier contained within the dashed line box 50 and which amplifier has an output 52 coupled to an LED driver circuit including transistors 176 and 180 as shown within the dashed line box 54. The output 52 of the amplifier is coupled to the base 174 of the transistor 176 and the base 178 of the transistor 180. The transistors 176, 180 conduct concurrently and each respectively excite a number of LEDs which are connected in a parallel circuit arrangement. The collector 182 of transistor 176 drives LEDs 184, 184 and the collector 186 of infrared transistor 180 drives the LEDs 188, 188. The LEDs 184, 184 and 188, 188 produce an optical beam in this case an infrared beam which carries the baseband frequency information. The operation of the LEDs are generally well known to those skilled in the art. The number of LEDs selected, in this case 14, permits an operating range of six to eight feet separation between the station unit and the terminal unit.

Speech, supervisory and other information is transmitted from the terminal unit in the form of an infrared energy beam which is sensed and detected by a detector shown within the dashed line box 98 and comprises a photodiode 190 the resistance of which diode typically varies in proportion to the intensity of the sensed light. A voltage divider network is formed by the series combination of resistor 192 and the photodiode 190 connected between the voltage source VCC and ground reference potential to provide a DC voltage at lead 194 which varies proportionally to the change in resistance of the photodiode and which voltage is representative of the variation in intensity of the infrared light transmitted from the terminal unit. The DC voltage output signal on lead 194 is inputted through a coupling capacitor 196 and resistor 198 in series with the input 200 of an operational amplifier 202 all of which components form a part of a preamplifier and 60 hertz rejection circuit contained within the dashed line box 102. The output 204 of amplifier 202 is coupled to the input of a further amplifier contained within the dashed line box 106 and which further amplifier comprises a coupling capacitor 206 in series with a resistor 208 connected to the input 210 of an operation amplifier 212. The amplifier 212 has an output 214 connected to the input of a transistor amplifier contained within the dashed line box 110 and which amplifier drives the earphone 114. The amplifier 110 comprises a transistor 216 arranged as an emitter follower having a variable resistance 218 connected in series between the emitter 220 of the transistor 216 and one input 222 of the earphone 114. A movable slider 224 is used to vary the resistance of the variable resistance 218 to control the magnitude of the earphone driving voltage signal and accordingly, the acoustic volume produced by the earphone 114. In addition, the variable resistance 218 may be adjusted to compensate for attenuation of the infrared energy beam transmitted from the station unit and received by the terminal unit.

The touch-tone signals used for dialing telephone numbers are generated by circuitry contained within the dashed line box 116 and includes a keypad designated generally 226 which has its keys arranged in the well known telephone keypad matrix arrangement. The keypad 226 has four outputs 228, 230, 232 and 234 representative of the first through fourth rows, respectively and outputs 236, 238 and 240 representative of the three respective columns of the keypad. The row and column output leads are coupled to a dual tone multi-frequency generator 242 which decodes the row/column combination identified through operation of a given key on the keypad 226 to produce the touch-tone frequencies corresponding to the number represented by that key. The touch-tone signals are outputted on lead 244 and are coupled to the input 166 of the amplifier 168 and which signals excite the LEDs 184,184 and 188,188 in the same manner as the "off-hook" signal as explained above.

Speech or other acoustic signals are converted to an electrical signal by the microphone 120. The microphone 120 may be an electret or other electronic type transducer well known to those skilled in the art. The output 246 of the microphone 120 is coupled to the input 166 of the amplifier 168 through a coupling capacitor 248 in series with the input 166. Speech or other acoustic signals converted to an electrical signal by the microphone 120 are processed and transmitted in a similar manner as the "off-hook" signal and the touch-tone signals.

At the completion of a call, the switch 146 is operated to its ON position which connects the VCC voltage potential to the reset lead 142 which resets the counter 132 and inhibits the generation of the 28 kilohertz "off-hook" signal required to establish and maintain a connection between the terminal and station units. Likewise, the "off-hook" lamp 164 extinguishes because the transistor 154 becomes nonconductive due to the application of the VCC voltage potential to its base 152 through the resistor 156. The call may also be terminated by operating a "Flash" switch 147 for the required time interval. The Flash switch 147 has one terminal 149 connected to the VCC voltage potential and a second terminal 145 connected to the reset lead 142 so that operation of the Flash switch connects the VCC voltage potential to the counter reset lead to inhibit the generation of the 28 KHz signal. As explained in detail below in the discussion of the station unit, the absence of the 28 kilohertz signal causes the station unit to terminate its connection between the telephone line and the telephone instrument after a predetermined time interval of approximately five seconds.

The infrared signals transmitted from the terminal unit to the station unit are sensed and detected by a photodiode 62 which produces a current having a magnitude proportional to the intensity of the received infrared signal. The photodiode 62 is coupled to the input of a differential amplifier 250 which produces a voltage signal at its output 252 which is the combined baseband frequency audio signal and the baseband 28 kilohertz "off-hook" signal. The signal at the output 252 is further processed to reject 60 hertz interference and is amplified by the operational amplifier 254 contained within the dashed line box 256. The output 258 of the amplifier 254 is connected to a bandpass filter contained within the dashed line box 260 and which filter is tuned to pass the 28 KHz "off-hook" signal when the signal is present to produce a voltage signal at the output 262 of amplifier 264. The voltage signal present on the output 262 indicates that the 28 KHz "off-hook" signal is being transmitted and is coupled through capacitor 266 to the input 268 of a phase lock loop integrated circuit 270. The phase lock loop integrated circuit 270 is well known to those skilled in the art and typically identified by the model number 567. The phase lock loop 270 is set to detect the 28 KHz "off-hook" signal to produce a voltage at its output 272 in response to the presence of that "off-hook" signal. The center frequency of the phase lock loop 270 is set by selection of the proper resistance of the series resistors 274 and 276 and the value of capacitor 278. The resistor 276 is of the variable resistance type and is used to precisely adjust the free running frequency of the oscillator within the phase lock loop integrated circuit 270. The output 272 of the phase lock loop 270 is coupled to the input of an inverting buffer amplifier 280 shown in the dashed line box 66b and the junction of a resistor 282 and the capacitor 284. The phase lock loop 270 produces a voltage output signal on lead 272 in the presence of the 28 KHz signal to charge the capacitor 284 and to cause the output 286 of the amplifier 280 to produce a positive voltage. The output 286 of amplifier 280 is coupled to the base 288 of a transistor 290 through a resistor 292. The positive voltage at the output 286 causes the transistor 290 to become conductive completing the connection between its collector 294 and the emitter 296 which is connected to a ground reference potential. The collector 294 of transistor 290 is connected to one end of the coil 298 of the off-hook relay 74 and the opposite end of the coil being connected to a voltage potential VBB so that the relay operates to transfer the tip and ring of a telephone line to the station unit and disconnect the tip and ring from the telephone instrument internal network when the transistor 290 is conductive. In the illustrated example, the tip and ring are connected to the transfer contact 300 and 302, respectively. In normal operation, the tip and ring of the telephone line pass through normally closed contacts 304 and 306, respectively to complete the circuit from the telephone line to the telephone instrument's internal components. In the presence of an off-hook signal sent from the terminal unit and sensed by the station unit as explained above, the relay 74 operates to cause the transfer of the tip and ring to the normally open contacts 308 and 310, respectively so that the tip and ring of the telephone line are connected to the input terminals 312 and 314, respectively of a two-wire to four-wire hybrid circuit 316 shown within the dashed line box 80. The two-wire to four-wire hybrid circuit 316 is well known to those skilled in the telephony art and which circuit converts a two-wire circuit to a four-wire circuit using the well known phantom balancing circuit arrangement.

The baseband audio frequency signals at the output 258 of amplifier 254 are fed to the input 318 of the receiver isolator circuit, shown within the dashed line box 128 and which circuit includes a repeating transformer 320 of the type typically used in the telephone industry and which typically has a 600 ohm input and 600 ohm output impedance and a one-to-one transformation ratio. The voltage signals on lead 318 cause a current to flow in the winding 322 which induces a voltage in the output winding 324. The output winding 324 is coupled to leads 326 and 328 respectively of the two-wire to four-wire hybrid circuit 316, and accordingly the tip and ring of the telephone line via the leads 312 and 314 connected through the transfer contacts of the operated relay 74.

The baseband frequency audio signals on lead 258 are also coupled to the input 330 of an operational amplifier 332 configured as a voltage follower and which produces a voltage signal at its output 334 equal in magnitude to the voltage at its input 330. The output 334 of the amplifier 332 is fed to a voltage doubler circuit shown within the dashed line box 336. The voltage charges the capacitor 338 of the voltage doubler to a voltage approximately equal to twice the magnitude of the voltage present at the output 334. The charging path is through a capacitor 340 connected in series with the output 334 and the junction of diodes 342 and 344, diode 342 having its cathode connected to one end of the capacitor 338 and the diode 344 having its anode connected to the opposite end of the capacitor 338 to charge the capacitor 338 so that the voltage present at the end 346 of the capacitor is twice the voltage at the output 334 of the amplifier 332.

The end 346 of the capacitor 338 is connected to the input 348 of a bar display generator integrated circuit 350 shown within the dashed line box 352. The bar display generator 350 has a number of outputs 354, 356, 358, 360, 362, 364 each of which is connected to a respective light emitting diode or other visual indicator 366, 368, 370, 372, 374 and 376 which LED's are shown within the dashed line box 378. The bar display generator 350 provides an output voltage signal to one or more of its outputs 354-364 to excite one or more of the respective LEDs 366-376. The number of LED's that are illuminated provide an indication of the signal strength of an infrared energy beam received at the photodiode 62. Accordingly, a user may determine by the number of LEDs that are illuminated whether or not the terminal unit is within proper operating range of the station unit.

Audio frequency signals, such as dial tone and speech when present across the tip and ring of the telephone line, are converted for optical transmission to the terminal unit is described as follows. Speech or other audio signals present across the tip and ring of the telephone line are inputted to the two-wire to four-wire hybrid circuit 316 via the input leads 312 and 314. The voltage signals are coupled to a transmit isolator circuit shown in the dashed line box 88 in a well known manner and as described above wherein audio signals are coupled to the input winding 380 of a one-to-one transformation ratio repeating transformer 382. The input winding 380 is connected across the output terminals 384 and 386 of the two-wire to four-wire hybrid circuit 316. Voltage signals appearing across the input winding 380 are transformed and induced in the output winding 388 to develop a voltage potential across the winding connected between lead 390 which is connected to a ground reference potential and a second end 392 which carries the voltage signals representative of the information to be transmitted to the terminal unit. The voltage signals on the output 392 are coupled through a series resistor 394 and filtering capacitor 396 to the base 398 of a transistor 400. The transistor amplifier 400 amplifies the signal received at its base 398 for output on its collector lead 402 which is connected to an LED driver circuit contained within the dashed line box 86. The LED driver circuit operates in a similar manner to the LED driver circuit in the terminal unit. The LED driver circuit includes transistors 406 and 408 which have their respective bases 410 and 412 coupled to the collector 402. The transistors 406 and 408 produce a voltage signal at their respective collectors 414 and 416 to excite the LEDs 418,418 and 420,420 respectively.

The LED driver transistors 406 and 408 are disabled in the absence of the detection of the 28 KHz "off-hook" signal which as discussed above, must be received to operate the relay 74. The voltage signal produced at the output 286 of the amplifier 280 not only activates the relay driver circuit contained within the dashed line box 90 but is also inputted to an inverting amplifier 422. The amplifier 422 produces an enabling signal at its output 424 which is connected to the gate terminal 426 of a field effect transistor 428. The transistor 428 is arranged as a switch to connect its source terminal 430 which is coupled to the collector 402 of transistor 400 to a ground reference potential through its drain terminal 432 in the presence of an enabling voltage signal at its gate 426. When an "off-hook" condition is detected by the station unit, the ground reference potential is removed from the collector 402 of the transistor 400 enabling it to drive the LED driver transistors 406 and 408 which in turn excite the LEDs 418,418 and 420,420 to transmit the audio signals received at the tip and ring via an infrared energy wave to the terminal unit. The baseband frequency audio signal is sensed and detected by the photodiode 190 contained within the dashed line box 98 in the same manner as dial tone is detected and as described above.

I claim:

1. In combination with a pay telephone instrument of the type arranged to accept coin, credit card and the like for connection to the public telephone switching network, apparatus for establishing a bi-directional optical communication path between a user and the telephone switching network, said apparatus comprising:
   a station unit means for interfacing between a telephone line associated with the public telephone switching network and a pay telephone instrument to couple the telephone line to the telephone instrument, said station unit having first and second operative states, said first state corresponding to the telephone line being electrically connected to the pay telephone instrument in the normal manner and said second state corresponding to the telephone line being electrically connected to the pay telephone instrument through said station unit means;
   a terminal unit means located remotely from said station unit means and arranged for optical coupling with said station unit means, said terminal unit means including:
   microphone means for sensing audio frequency signals and for converting said signals to baseband frequency electrical signals, said microphone means having an output;
   receiver earpiece means for sensing baseband frequency electrical signals carrying information in the audio frequency spectrum to convert said sensed electrical signals to sound for hearing by a user;
   keypad number circuit means for generating touch-tone baseband frequency signals at an output to dial a telephone number;
   supervisory circuit means for generating a baseband frequency supervisory signal representative of an "off-hook" condition for initiating a call connection with said station unit means and to sustain said optical coupling between said station and terminal units;
   circuit means for converting said baseband frequency signals into baseband frequency optical signals for transmission to said station unit;
   optical receiver means for sensing optical signals and for converting said sensed optical signals into electrical signals representative of said baseband frequency signals originating at said station unit means;
   said station unit means including;
   circuit means responsive to an "off-hook" supervisory signal for causing said station unit means to operate to its second operative state, said "off-hook" responsive circuit means including circuit means for enabling amplifier circuit means to couple baseband frequency electrical signals appearing on the telephone line to circuit means for converting the baseband frequency electrical signals to optical signals for transmission to said terminal unit,
   whereby audio frequency signals appearing on said telephone line are received at the earpiece of said terminal unit and audio frequency signals at the microphone of said terminal unit are received at said telephone line.

2. In combination with a pay telephone instrument as defined in claim 1 wherein said station unit means further comprises:
   a passive two wire-to-four wire hybrid circuit for coupling the tip and ring of the telephone line to a transmit isolator circuit means and a receive isolator circuit means to transfer audio frequency electrical signals to and from the telephone line and between the telephone line and said station unit means when said station unit means is so operated to its second operative state;
   said receive isolator circuit means having an output coupled to an input of said amplifier circuit means;
   said amplifier circuit means having an output coupled to an input of a first LED excitation circuit means for causing said excitation circuit means to produce an excitation voltage signal corresponding to and representative of the baseband frequency voltage signal appearing on the telephone line;
   said excitation circuit means having an output and being coupled to at least one LED for exciting said LED to produce said optical signals for transmission to said terminal unit, said optical signals being infrared signals.

3. In combination with a pay telephone instrument as defined in claim 1 wherein said terminal unit means further comprises:
   said supervisory circuit means comprising a crystal oscillation having a predetermined oscillation frequency and an output coupled to the input of a ripple counter, said ripple counter having an enabling input coupled to an on-hook/off-hook selectable signal source, said counter being disabled when an on-hook voltage signal is applied to said enabling input and continuously generating said supervisory signal at an output when an off-hook voltage signal is applied to said enabling input;

summing amplifier circuit means having a summing input and an output, said input being coupled to the respective outputs of said microphone means, said ripple counter and said keypad circuit means;

said summing amplifier output being coupled to an input of a second LED excitation circuit means for causing said excitation circuit means to produce an excitation voltage signal corresponding to and representative of the baseband frequency voltage signals appearing at the respective outputs of said microphone means, said ripple counter and said keypad circuit means;

said second LED excitation circuit means having an output and being coupled to at least one LED for exciting said LED to produce said optical signals for transmission to said station unit, said optical signals being infrared signals.

4. In combination with a pay telephone instrument as defined in claim 1 wherein said optical receiver means includes a photodiode.

5. In combination with a pay telephone instrument as defined in claim 4 wherein said photodiode is sensitive to infrared optical signals.

6. In combination with a pay telephone instrument as defined in claim 3 wherein said on-hook/off-hook selectable signal source includes a single pole, single throw switch coupled between a source voltage potential and a group voltage reference potential, said switch being operated to a position corresponding to the off-hook condition to connect one of said source and ground voltage potentials to said enabling input and said switch being in an unoperated position corresponding to the on-hook condition to connect the other of said source and ground voltage potentials to said enabling input.

7. In combination with a pay telephone instrument as defined in claim 6 wherein said terminal unit means further includes a visual indicating device, said device being illuminated to indicate said terminal unit being in an off-hook condition.

8. In combination with a pay telephone instrument as defined in claim 1 wherein said station unit means further includes an optical receiver means for sensing optical signals transmitted from said terminal unit means and for converting said sensed optical signals into electrical signals representative of baseband frequency signals originating at said terminal unit.

9. In combination with a pay telephone instrument as defined in claim 8 wherein said optical receiver means includes a photodiode.

10. In combination with a pay telephone instrument as defined in claim 9 wherein said photodiode is sensitive to infrared optical signals.

11. In combination with a pay telephone instrument as defined in claim 3 wherein said supervisory responsive circuit means is sensitive to said supervisory signal baseband frequency and for producing an output voltage signal representative of and corresponding to an off-hook condition at said terminal unit means said responsive circuit means being tunable to the frequency of said supervisory signal and producing said output voltage signal when said supervisory signal is present at the input to said supervisory responsive circuit means, said supervisory responsive circuit means including a time delay circuit means for maintaining said output voltage for a predetermined time interval after said supervisory signal is removed from the input of said supervisory responsive circuit means whereby a connection is sustained between said terminal unit means and said telephone when the optical transmission path between said terminal and station is interrupted for a period of time less than said predetermined time interval.

12. In combination with a pay telephone instrument as defined in claim 11 wherein said supervisory responsive circuit means comprises a phase lock loop circuit.

13. In combination with a pay telephone instrument as defined in claim 8 wherein said optically converted electrical signals are amplified by amplifier circuit means, said amplifier circuit means having an output coupled to said transmit isolator circuit means for transferring said amplified electrical signals to the telephone line.

14. In combination with a pay telephone instrument as defined in claim 13 wherein said station unit means further includes means for sensing the relative strength of an optical signal sensed by said optical receiver means, said strength sensing means comprising a bar graph generating circuit means having at least one output coupled to at least one associated visual indicating device, said bar graph generating circuit means producing a voltage signal at said at least one output when a voltage signal present at an input to said generating circuit means exceeds a predetermined magnitude to illuminate the associated indicating device, said input being coupled to said transmit isolator circuit means whereby the illumination of said at least one associated indicating device provides the user a relative measure of strength of the received optical signal.

15. In combination with a pay telephone instrument as defined in claim 14 wherein said bar graph generating circuit means has a plurality of outputs each of which is coupled to an associated visual indicating device whereby the strength of the received optical signal is proportional to the number of illuminated indicated devices.

* * * * *